(12) United States Patent
Katepalli et al.

(10) Patent No.: US 11,582,670 B2
(45) Date of Patent: Feb. 14, 2023

(54) ADAPTIVE CARRIER SWITCHING

(71) Applicant: AIRSPAN IP HOLDCO LLC, Boca Raton, FL (US)

(72) Inventors: Venkateswarlu Katepalli, Slough (GB); Andrew Logothetis, High Wycombe (GB); Marlon Peter Persaud, Beaconsfield (GB); Krzysztof Dudzinski, Langley (GB); Ashvtosh Goel, Slough (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 54 days.

(21) Appl. No.: 16/836,638

(22) Filed: Mar. 31, 2020

(65) Prior Publication Data
US 2020/0329480 A1    Oct. 15, 2020

(30) Foreign Application Priority Data

Apr. 12, 2019   (GB) ...................................... 1905222
Oct. 17, 2019   (GB) ...................................... 1915033

(51) Int. Cl.
*H04W 36/30*       (2009.01)
*H04L 5/00*        (2006.01)
(Continued)

(52) U.S. Cl.
CPC .......... *H04W 36/30* (2013.01); *H04B 17/309* (2015.01); *H04L 5/001* (2013.01);
(Continued)

(58) Field of Classification Search
CPC ...... H04W 24/08; H04W 36/30; H04L 5/001; H04B 17/309
See application file for complete search history.

(56) References Cited

U.S. PATENT DOCUMENTS 6,211,926 B1    4/2001  Won
7,180,876 B1 *  2/2007  Henry .................. H04W 48/18
                                              370/329
(Continued)

FOREIGN PATENT DOCUMENTS

EP    2373111 A1    10/2011
EP    2991403 A2    3/2016
(Continued)

OTHER PUBLICATIONS

GB Search Report from GB2003024.3 dated Nov. 13, 2020, 4 pages.
(Continued)

*Primary Examiner* — Kevin C. Harper
(74) *Attorney, Agent, or Firm* — Haynes Beffel & Wolfeld LLP; Andrew L. Dunlap

(57) ABSTRACT

A communication apparatus, terminal apparatus, system and method are provided for performing wireless communication. The communication apparatus supports a plurality of component carriers, wherein one of the plurality of component carriers is designated as a current primary component and at least one of the plurality of component carriers is designated as a current secondary component carrier providing at least downlink communication. The communication apparatus comprises control circuitry for controlling a component carrier testing procedure for one or more component carriers. The testing procedure comprises, for each component carrier: establishing an uplink connection from the terminal apparatus to the communication apparatus using the component carrier; and determining a quality of the uplink connection for the component carrier. The control circuitry is responsive to completion of the testing procedure to designate an updated primary component carrier on the
(Continued)

basis of the qualities of the uplink connections determined for the component carriers.

19 Claims, 10 Drawing Sheets

(51) Int. Cl.
| | |
|---|---|
| *H04W 24/08* | (2009.01) |
| *H04B 17/309* | (2015.01) |
| *H04B 17/10* | (2015.01) |
| *H04B 17/12* | (2015.01) |
| *H04B 17/18* | (2015.01) |
| *H04L 41/0803* | (2022.01) |
| *H04W 16/10* | (2009.01) |
| *H04W 72/04* | (2009.01) |
| *H04W 72/08* | (2009.01) |
| *H04B 7/185* | (2006.01) |
| *H04W 24/02* | (2009.01) |
| *H04W 24/10* | (2009.01) |
| *H04W 76/10* | (2018.01) |
| *H04W 72/0453* | (2023.01) |

(52) U.S. Cl.
CPC ......... *H04W 24/08* (2013.01); *H04B 7/18504* (2013.01); *H04B 17/101* (2015.01); *H04B 17/12* (2015.01); *H04B 17/18* (2015.01); *H04L 41/0803* (2013.01); *H04W 16/10* (2013.01); *H04W 24/02* (2013.01); *H04W 24/10* (2013.01); *H04W 72/042* (2013.01); *H04W 72/0453* (2013.01); *H04W 72/082* (2013.01); *H04W 72/085* (2013.01); *H04W 76/10* (2018.02)

(56) References Cited

U.S. PATENT DOCUMENTS

| | | | |
|---|---|---|---|
| 10,085,266 B1* | 9/2018 | Pawar | H04W 72/0486 |
| 10,693,557 B1 | 6/2020 | Ayotte | |
| 11,146,448 B2 | 10/2021 | Persaud et al. | |
| 2006/0229104 A1 | 10/2006 | de La Chapelle et al. | |
| 2007/0165526 A1 | 7/2007 | Lee | |
| 2009/0047971 A1 | 2/2009 | Fu | |
| 2009/0096857 A1 | 4/2009 | Frisco et al. | |
| 2009/0191877 A1 | 7/2009 | Jang et al. | |
| 2009/0221302 A1 | 9/2009 | Luiro et al. | |
| 2009/0264128 A1* | 10/2009 | Tomisawa | H04W 36/30 455/436 |
| 2009/0318138 A1 | 12/2009 | Zeng et al. | |
| 2010/0197317 A1 | 8/2010 | Sadek et al. | |
| 2010/0329200 A1* | 12/2010 | Chen | H04W 72/042 370/329 |
| 2011/0026476 A1* | 2/2011 | Lee | H04W 74/006 370/329 |
| 2012/0042345 A1 | 2/2012 | Tjio et al. | |
| 2012/0263117 A1 | 10/2012 | Love et al. | |
| 2013/0109401 A1 | 5/2013 | Ma et al. | |
| 2013/0182655 A1 | 7/2013 | Das et al. | |
| 2014/0086155 A1 | 3/2014 | Chen | |
| 2014/0094165 A1 | 4/2014 | Karlsson et al. | |
| 2014/0126498 A1 | 5/2014 | Koorapaty et al. | |
| 2015/0050941 A1 | 2/2015 | Sawada et al. | |
| 2015/0172987 A1 | 6/2015 | Balakrishnan et al. | |
| 2015/0245218 A1 | 8/2015 | Hassan et al. | |
| 2015/0256314 A1 | 9/2015 | Gauvreau et al. | |
| 2015/0280806 A1 | 10/2015 | Jalali | |
| 2015/0341945 A1* | 11/2015 | Panchai | H04L 5/001 370/329 |
| 2016/0014657 A1 | 1/2016 | Le et al. | |
| 2016/0262065 A1* | 9/2016 | Axmon | H04W 36/0083 |
| 2017/0048863 A1 | 2/2017 | Tsai et al. | |
| 2018/0014269 A1 | 1/2018 | Lauer et al. | |
| 2018/0035416 A1 | 2/2018 | Yi et al. | |
| 2018/0063736 A1 | 3/2018 | Sadeghi et al. | |
| 2018/0070280 A1 | 3/2018 | Nittala et al. | |
| 2018/0084562 A1 | 3/2018 | Ramamurthi et al. | |
| 2018/0192327 A1 | 7/2018 | Gaydos et al. | |
| 2018/0206133 A1 | 7/2018 | Venkatraman et al. | |
| 2019/0281441 A1 | 9/2019 | Huang et al. | |
| 2019/0319723 A1* | 10/2019 | Axmon | H04B 17/24 |
| 2019/0327631 A1 | 10/2019 | Huang et al. | |
| 2020/0092685 A1 | 3/2020 | Fehrenbach et al. | |

FOREIGN PATENT DOCUMENTS

| | | |
|---|---|---|
| EP | 3062446 A1 | 8/2016 |
| EP | 3167654 A1 | 5/2017 |
| EP | 3346784 A1 | 7/2018 |
| EP | 3387861 A1 | 10/2018 |
| WO | 2016007295 A1 | 1/2016 |
| WO | 2017097997 A1 | 6/2017 |
| WO | 2018210945 A1 | 11/2018 |

OTHER PUBLICATIONS

U.S. Office Action in U.S. Appl. No. 16/827,970 dated Sep. 28, 2020, 49 pages.
EP Search Report from EP20166798.7 dated Aug. 28, 2020, 8 pages.
EP Search Report from EP20166810.0 dated Sep. 1, 2020, 7 pages.
GB Search Report from GB1915033.3 dated Apr. 1, 2020, 4 pages.
GB Search Report from GB2003168.8 dated Aug. 5, 2020, 5 pages.
Dictionary.com definition for "configuration", Jan. 5, 2021, 1 page.
U.S. Office Action in U.S. Appl. No. 16/836,711 dated Jun. 10, 2021, 12 pages.
U.S. Office Action in U.S. Appl. No. 16/827,970 dated Jan. 13, 2021, 60 pages.
U.S. Office Action in U.S. Appl. No. 16/828,821 dated Nov. 29, 2021, 10 pages.
EP Exam Report from EP20166810.0 dated May 24, 2022, 5 pages.
GB Exam Report from GB1915033.3 dated Jul. 25, 2022, 4 pages.
GB Exam Report from GB2003024.3 dated Apr. 11, 2022, 5 pages.
GB Exam Report from GB2003168.8 dated Apr. 13, 2022, 5 pages.
U.S. Appl. No. 16/828,821—Final Office Action dated Apr. 5, 2022, 16 pages.
GB 2nd Exam Report from GB2003024.3 dated Sep. 1, 2022, 7 pages.
GB Second Exam Report from GB2003168.8 dated Aug. 23, 2022, 4 pages.
U.S. Office Action in U.S. Appl. No. 16/828,821, dated Aug. 16, 2022, 24 pages.

* cited by examiner

ADAPTIVE CARRIER SWITCHING

TECHNICAL FIELD

The present disclosure relates to wireless communication. In particular, the present disclosure relates to a wireless communication apparatus, method and system for designating appropriate component carriers.

DESCRIPTION

Wireless communication systems based on standards such as LTE, LTE-Advanced and 5G New Radio (NR) use carrier aggregation to enable high data rates. Available bands are split into component carriers (CCs) and the total aggregated bandwidth can be exploited. Component carriers may be designated as primary or secondary component carriers, and may handle uplink or downlink communications, or both. Each component carrier has an associated strength and/or quality and it is desirable to use CCs with the highest quality to provide a best possible user experience.

For example, in 3GPP Release 13, an eNodeB could be configured to support up to 32 Component Carriers (CC). This technique is known as Carrier Aggregation (CA). The aim is to transmit multiple LTE signals in parallel to the same device, in order to increase the data bandwidth to said device. The eNodeB advertises the number of Downlink (DL) CCs and the number of Uplink (UL) CCs that it can simultaneously process. The number of UL CCs never exceeds the number of DL CCs. In addition, one of the carriers is considered as the Primary Component Carrier (PCC) and the remaining are the so called Secondary Component Carriers (SCC). The PCC is mapped to the (DL) carrier which was used to acquire initial connection with eNodeB, and it is the same PCC used for the UL transmission.

In a further example in 3GPP Release 15 (NR), UL and DL CCs are also utilised. Further to CCs, NR introduces the concept of Bandwidth Parts (BWP) within a component carrier. Up to 4 BWPs can be utilised, but 1 BWP per CC is active at any time instant.

SUMMARY

At least some examples provide a communication apparatus for performing wireless communication with a terminal apparatus, wherein the communication apparatus supports a plurality of component carriers, wherein one of the plurality of component carriers is designated as a current primary component carrier providing uplink and downlink communication and at least one of the plurality of component carriers is designated as a current secondary component carrier providing at least downlink communication, the communication apparatus comprising control circuitry for controlling a component carrier testing procedure for one or more component carriers, the component carrier testing procedure comprising, for each component carrier:

establishing an uplink connection from the terminal apparatus to the communication apparatus using the component carrier; and determining a quality of the uplink connection for the component carrier, and the control circuitry is responsive to completion of the component carrier testing procedure to designate an updated primary component carrier on the basis of the qualities of the uplink connections determined for the component carriers.

At least some examples provide a terminal apparatus for performing wireless communication with a communication apparatus, wherein the terminal apparatus supports a plurality of component carriers, wherein one of the plurality of component carriers is designated as a current primary component carrier providing uplink and downlink communication and at least one of the plurality of component carriers is designated as a current secondary component carrier providing at least downlink communication, the terminal apparatus comprising control circuitry for participating in a component carrier testing procedure for one or more component carriers, the component carrier testing procedure comprising, for each component carrier:

establishing an uplink connection from the terminal apparatus to the communication apparatus using the component carrier; and sending uplink traffic via the uplink connection, and the control circuitry is responsive to a determination made by the communication apparatus to designate an updated primary component carrier.

At least some examples provide a communication system comprising a communication apparatus and a terminal apparatus, wherein the communication apparatus and the terminal apparatus support a plurality of component carriers, wherein one of the plurality of component carriers is designated as a current primary component carrier providing uplink and downlink communication and at least one of the plurality of component carriers is designated as a current secondary component carrier providing at least downlink communication, the communication apparatus comprising control circuitry for controlling a component carrier testing procedure for one or more component carriers the component carrier testing procedure comprising, for each component carrier:

establishing an uplink connection from the terminal apparatus to the communication apparatus using the component carrier; and determining a quality of the uplink connection for the component carrier, and the terminal apparatus comprising control circuitry for participating in the component carrier testing procedure for one or more component carriers comprising, for each component carrier:

establishing the uplink connection with the communication apparatus using the component carrier; and sending uplink traffic via the uplink connection, wherein the control circuitry of the communication apparatus is responsive to completion of the component carrier testing procedure to designate an updated primary component carrier on the basis of the qualities of the uplink connections determined for the component carriers.

At least some examples provide a communication method for use in a communication apparatus for performing wireless communication with a terminal apparatus, wherein the communication apparatus supports a plurality of component carriers, wherein one of the plurality of component carriers is designated as a current primary component carrier providing uplink and downlink communication and at least one of the plurality of component carriers is designated as a secondary uplink component carrier providing at least downlink communication, the method comprising:
controlling a component carrier testing procedure for one or more component carriers, the component carrier testing procedure comprising, for each component carrier:
establishing an uplink connection from the terminal apparatus to the communication apparatus using the component carrier; and
determining a quality of the uplink connection for the component carrier,
and in response to completion of the component carrier testing procedure, designating an updated primary component carrier on the basis of the qualities of the uplink connections determined for the component carriers.

At least some examples provide a communication method for use in a terminal apparatus for performing wireless communication with a communication apparatus,
wherein the terminal apparatus supports a plurality of component carriers, wherein one of the plurality of component carriers is designated as a current primary component carrier providing uplink and downlink communication and at least one of the plurality of component carriers is designated as a current secondary component carrier providing at least downlink communication,
the method comprising:
participating in a component carrier testing procedure for one or more component carriers, the component carrier testing procedure comprising, for each component carrier:
establishing an uplink connection from the terminal apparatus to the communication apparatus using the component carrier; and
sending uplink traffic via the uplink connection,
and designating an updated primary component carrier in response to a determination made by the communication apparatus.

At least some examples provide a communication method for performing wireless communication for use in system comprising a communication apparatus and a terminal apparatus,
wherein a plurality of component carriers are supported, wherein one of the plurality of component carriers is designated as a current primary component carrier providing uplink and downlink communication and at least one of the plurality of component carriers is designated as a current secondary component carrier providing at least downlink communication,
the method comprising:
controlling a component carrier testing procedure for one or more component carriers, the component carrier testing procedure comprising, for each component carrier:
establishing an uplink connection from the terminal apparatus to the communication apparatus using the component carrier;
transmitting uplink traffic via the uplink connection;
and determining a quality of the uplink connection for the component carrier,
and designating an updated primary component carrier in response to completion of the component carrier testing procedure on the basis of the qualities of the uplink connections determined for the component carriers.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
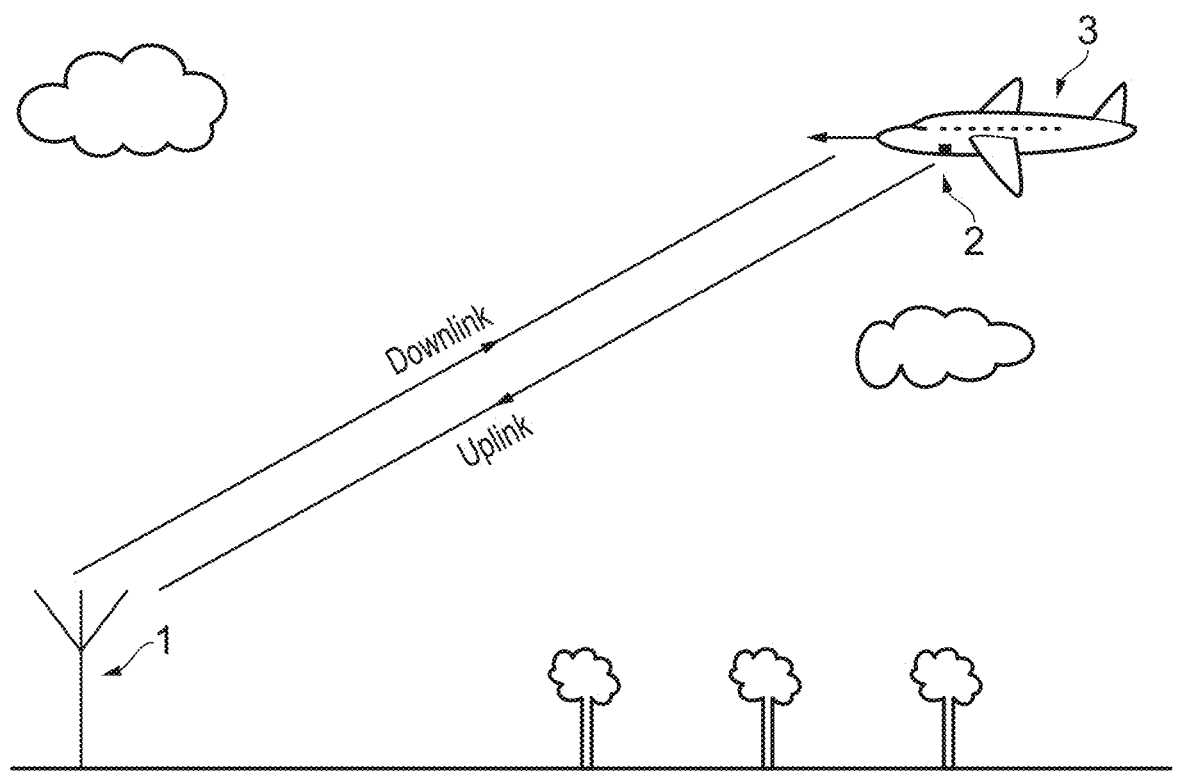
FIG. 1 schematically illustrates an environment in which the present technique may be applied according to an embodiment.

Before discussing the embodiments with reference to the accompanying figures, the following description of embodiments is provided.

LTE makes use of primary and secondary component carriers (CCs) and up to 32 CCs may be supported by a system. This enables multiple LTE signals to be transmitted in parallel to the same device. The number of uplink component carriers is never greater than the number of downlink component carriers and each component carrier has an associated strength and/or quality. The primary component carrier provides both uplink and downlink communication, and may be designated as the first component carrier used to acquire the initial downlink connection. The present technology proposes apparatuses and methods in which a secondary uplink component carrier is used to measure the quality of each component carrier and a revised primary component carrier may be designated.

In the LTE example, during the connection process, the UE signals its capabilities, such as for example the number of DL and UL CCs that it can support. The number of UL and DL CCs need not be the same. In fact, it is common for UEs to have the capability of supporting far more DL CCs than UL CCs. This poses the problem of optimal selection of UL CCs to be used out of the configured DL CCs. In addition, when UL and DL interference levels are not identical, one cannot rely on DL measurements to indicate the preferred set of UL CCs. The interference mismatch is particularly acute in deployments such as Air-To-Ground (ATG), where DL interference comprises unsolicited interference sources such as for example Wi-Fi devices scattered in the vicinity of the eNodeB. Still further, a third issue that may cause a problem in determining the optimal selection of the UL CCs is the intermittent nature of UL data traffic. In the absence of UL traffic, a quality metric of the UL channel cannot be derived, since no data in the UL is transmitted.

The aforementioned problems pose a significant challenge to the eNodeB. In particular, while the eNodeB is constrained to use the same CC index for the UL and the DL for the PCC, there are a number of possibilities for assigning a subset of the available SCCs to be used for UL transmission.

In accordance with one example configuration there is provided a communication apparatus for performing wireless communication with a terminal apparatus. The communication apparatus supports a plurality of component carriers, wherein one of the plurality of component carriers is designated as a current primary component carrier providing uplink and downlink communication and at least one of the plurality of component carriers is designated as a current secondary component carrier providing at least downlink communication. The communication apparatus comprises control circuitry for controlling a component carrier testing procedure for one or more component carriers. The component carrier testing procedure comprises, for each component carrier: establishing an uplink connection from the terminal apparatus to the communication apparatus using the component carrier; and determining a quality of the uplink connection for the component carrier. The control circuitry is responsive to completion of the component carrier testing procedure to designate an updated primary component carrier on the basis of the qualities of the uplink connections determined for the component carriers.

The communication apparatus may be an eNodeB, gNB, base station or otherwise labelled device; of significance here is only that it receives uplink traffic. Using a component carrier currently designated as a secondary uplink component carrier to transmit some of this uplink traffic, enables the quality of the component carrier, as a potential primary CC carrying uplink traffic, to be determined. The secondary uplink CC is then designated for each component carrier in turn and the qualities of all CCs can be determined. The currently designated primary CC remains the same throughout this process; this preserves the quality of the connection for the user. A determination can be made when all of the qualities have been ascertained as to whether one of the other CCs would provide a better quality primary uplink CC than the one currently designated. If this is the case this new primary CC is designated. This thereby supports continued optimal designation of the primary CC.

In some examples, the updated primary component carrier is designated based on a parameter representing the quality of the uplink connection for the component carrier exceeding a predetermined value. This parameter may be a quantity which changes over time. Thus, the primary CC designated during the initial establishment of the connection may not be the highest quality or most suitable, especially if it has changed with time. Changing the primary CC can be a costly handover procedure in terms of data throughput, so it may be desirable to introduce a threshold quality below which the re-designation of the primary CC is not undertaken. This discourages repeated switching of the primary CC.

The parameter representing the quality of the uplink connection for the component carrier may be a measure of uplink throughput. It will be appreciated that there may be various metrics used to measure the quality of an uplink connection. For example, the parameter representing the quality of the uplink connection for the component carrier may be a measure of signal strength. The metric that is used may depend on the specifics of the system to which the present technology is applied.

In at least some examples the predetermined value is a parameter representing the uplink quality of the current primary component carrier plus an additional threshold value. That is, in order for the primary CC to be re-designated, it must represent a significant increase in quality. This additional threshold value may be referred to as a hysteresis value. This is an additional amount added to the current quality of the primary CC to create the threshold needed to re-designate the primary CC to this higher quality CC. This helps to prevent unnecessary re-designation from taking place, which can be costly as described above.

At least some examples provide a terminal apparatus for performing wireless communication with a communication apparatus. The terminal apparatus supports a plurality of component carriers, wherein one of the plurality of component carriers is designated as a current primary component carrier providing uplink and downlink communication and at least one of the plurality of component carriers is designated as a current secondary component carrier providing at least downlink communication. The terminal apparatus comprises control circuitry for participating in a component carrier testing procedure for one or more component carriers. The component carrier testing procedure comprises, for each component carrier: establishing an uplink connection from the terminal apparatus to the communication apparatus using the component carrier; and sending uplink traffic via the uplink connection. The control circuitry is responsive to a determination made by the communication apparatus to designate an updated primary component carrier.

The terminal apparatus may be otherwise labelled as user equipment, simply a terminal or similar. The terminal apparatus sends uplink traffic to be received by a communication apparatus. In the component carrier testing procedure of the present techniques this traffic is sent using a secondary uplink CC, and is used by the communication apparatus to determine the quality of the CC. A new primary CC may then be determined and designated. It should be made clear that the terminal apparatus and communication apparatus both recognise the same CC as being the designated primary CC.

In some examples, the terminal apparatus is configured to generate dummy uplink traffic for the component carrier testing procedure when insufficient uplink traffic for the component carrier testing procedure would otherwise be generated for communication purposes. In general, it is typical for more downlink traffic to be generated during wireless communication compared to uplink traffic. In some cases minimal or even no uplink traffic may currently be using the secondary uplink component carrier when the component carrier testing procedure of the present techniques is to be carried out. Therefore, the communication apparatus may not be able to accurately determine the quality of a CC. Thus, if insufficient traffic is currently being generated, the terminal apparatus may instead generate dummy traffic. The quality of the CC can then nevertheless be determined, despite the lack of "regular" traffic on which to base the measurement.

The component carrier testing procedure and designation of the updated primary component carrier may be repeated periodically. If the quality of the uplink component carrier changes over time, the optimal primary component carrier is also likely to change. Thus, in order to ensure the continued quality of the connection, the procedure to determine the quality of the CCs and re-designation of the primary CC may be repeated.

In some examples the component carrier testing procedure and designation of the updated primary component carrier is repeated with fixed, predetermined periodicity. The exact value of this periodicity can be based on the specific implementation of the present technology.

In contrast, the component carrier testing procedure and designation of the updated primary component carrier may be repeated with a selectable periodicity. This periodicity could be selected in dependence on a range of factors, depending on the requirements of the particular implementation. Alternatively or in addition, the testing and designation procedures may be triggered by a predetermined event.

The component carrier testing procedure and designation of the updated primary component carrier may be carried out upon setup of a wireless communication link between the communication apparatus and the terminal apparatus. Once the initial connection between a terminal apparatus and a communication apparatus has been established, the testing and designation process may be triggered. This ensures that the most suitable primary CC is designated from the outset. It will be appreciated that a link between the two apparatuses may be setup following a handover procedure by the terminal apparatus from another communication apparatus.

The primary component carrier may be the component carrier which is used to establish an initial downlink connection. The primary CC may be designated on setup as the initial downlink CC used to acquire the connection. This enables the terminal apparatus to receive various configurational information from the communication apparatus and enables the communication apparatus to maintain overall control of the communication configuration. It should be noted that the significance of designation of the primary CC may therefore mean that this whilst the other (secondary) CCs may be changed with little or no disruption to communication, a change of the primary CC is more likely to (at least temporarily) be disruptive.

In at least some examples the duration of the testing procedure is selectable. That is the amount of time spent measuring the quality may be variable and selectable depending on various factors. For example, the speed of a vehicle carrying the terminal device or the amount of useful uplink traffic may be taken into account. This enables more accurate determination of the quality of the uplink connection for each of the component carriers.

At least one secondary component carrier may also provide uplink communication. That is, one or more component carriers may provide both uplink and downlink communication, in addition to the primary component carrier. In some examples, 32 CCs are supported and one is designated as the primary CC which provides both uplink and downlink communication. The other 31 CCs are all designated as secondary downlink CCs and one or more of these may also be designated as a secondary uplink CC thereby also providing uplink communication. This enables greater bandwidth for uplink communication and therefore an improved user experience.

In the component carrier testing procedure the component carrier may be designated as a secondary uplink component carrier in order to carry out the component carrier testing procedure. That is, each of the secondary downlink CCs may be designated as a secondary uplink CC in turn, in order for its uplink quality to be determined. This means that useful uplink traffic is sent via the measured CC when required, causing reduced disruption to user experience. This technique means that existing mechanisms can be used to switch between the secondary CCs and test the quality of them.

In at least some examples an updated secondary uplink component carrier is also designated on the basis of the qualities of the uplink connections determined for the component carriers. Once the most appropriate CC has been designated as primary component carrier, the next most appropriate CC may also be designated as a secondary uplink component carrier. This may be the CC with the next highest quality, or in the case where a hysteresis value is introduced and the primary CC is not designated as the highest quality CC, the highest quality CC may be designated as a secondary uplink CC. In this way, an improved user experience can be provided as the two most appropriate CCs are designated as primary and secondary uplink CCs.

In accordance with one example configuration there is provided a communication system comprising a communication apparatus and a terminal apparatus. The communication apparatus and the terminal apparatus support a plurality of component carriers. One of the plurality of component carriers is designated as a current primary component carrier providing uplink and downlink communication and at least one of the plurality of component carriers is designated as a current secondary component carrier providing at least downlink communication. The communication apparatus comprises control circuitry for controlling a component carrier testing procedure for one or more component carriers, the component carrier testing procedure comprising, for each component carrier: establishing an uplink connection from the terminal apparatus to the communication apparatus using the component carrier; and determining a quality of the uplink connection for the component carrier. The terminal apparatus comprises control circuitry for participating in the component carrier testing procedure for one or more component carriers comprising, for each component carrier: establishing the uplink connection with the communication apparatus using the component carrier; and sending uplink traffic via the uplink connection. The control circuitry of the communication apparatus is responsive to completion of the component carrier testing procedure to designate an updated primary component carrier on the basis of the qualities of the uplink connections determined for the component carriers.

A system may comprise the communication apparatus and the terminal apparatus as described above.

In at least some examples the terminal apparatus is attached to a vehicle arranged to move relative to the communication apparatus. If the terminal is moving relative to the communication apparatus, it may cause noticeable fluctuations in the quality of the component carriers. Thus, the present technique may be particularly advantageous in these situations.

The vehicle may be an aeroplane; particularly given the speeds at which an aeroplane moves with respect to a communication apparatus on the ground, the present technique may prove particularly useful. It will be appreciated that other vehicles such as fast moving trains may also benefit from the present technique providing a more consistent, higher quality connection.

In accordance with one example configuration there is provided a communication method for use in a communication apparatus for performing wireless communication with a terminal apparatus. The communication apparatus supports a plurality of component carriers, wherein one of the plurality of component carriers is designated as a current primary component carrier providing uplink and downlink communication and at least one of the plurality of component carriers is designated as a secondary uplink component carrier providing at least downlink communication. The method comprises controlling a component carrier testing procedure for one or more component carriers. The component carrier testing procedure comprising, for each component carrier: establishing an uplink connection from the terminal apparatus to the communication apparatus using the component carrier; and determining a quality of the uplink connection for the component carrier. The method further comprises, in response to completion of the component carrier testing procedure, designating an updated primary component carrier on the basis of the qualities of the uplink connections determined for the component carriers.

In accordance with one example configuration there is provided a communication method for use in a terminal apparatus for performing wireless communication with a communication apparatus. The terminal apparatus supports a plurality of component carriers, wherein one of the plurality of component carriers is designated as a current primary component carrier providing uplink and downlink communication and at least one of the plurality of component carriers is designated as a current secondary component carrier providing at least downlink communication. The method comprises participating in a component carrier testing procedure for one or more component carriers. The component carrier testing procedure comprises, for each component carrier: establishing an uplink connection from the terminal apparatus to the communication apparatus using the component carrier; and sending uplink traffic via the uplink connection. The method further comprises designating an updated primary component carrier in response to a determination made by the communication apparatus.

In accordance with one example configuration there is provided a communication method for performing wireless communication for use in system comprising a communication apparatus and a terminal apparatus. A plurality of component carriers are supported, wherein one of the plurality of component carriers is designated as a current primary component carrier providing uplink and downlink communication and at least one of the plurality of component carriers is designated as a current secondary component carrier providing at least downlink communication. The method comprises controlling a component carrier testing procedure for one or more component carriers. The component carrier testing procedure comprises, for each component carrier: establishing an uplink connection from the terminal apparatus to the communication apparatus using the component carrier; transmitting uplink traffic via the uplink connection; and determining a quality of the uplink connection for the component carrier. The method further comprises designating an updated primary component carrier in response to completion of the component carrier testing procedure on the basis of the qualities of the uplink connections determined for the component carriers.

Particular embodiments will now be described with reference to the figures.

FIG. 1 schematically illustrates an environment in which the present techniques may be applied according to an embodiment. A terminal apparatus or user equipment (UE) 2 communicates with a communication apparatus or base station 1. The UE is attached or otherwise positioned in or on an aeroplane 3 moving relative to the base station 1. As discussed above, the present techniques are not limited to an aeronautical application, and this is included here as an example only. Uplink communication transfers information from the UE 2 to the base station 1 as indicated. Downlink communication transfers information from the base station 1 to the UE 2 in the opposite direction to the uplink. A network of base stations may be provided in order to enable wireless communication services to the passengers on the moving aeroplane as it travels.

Figure 2:
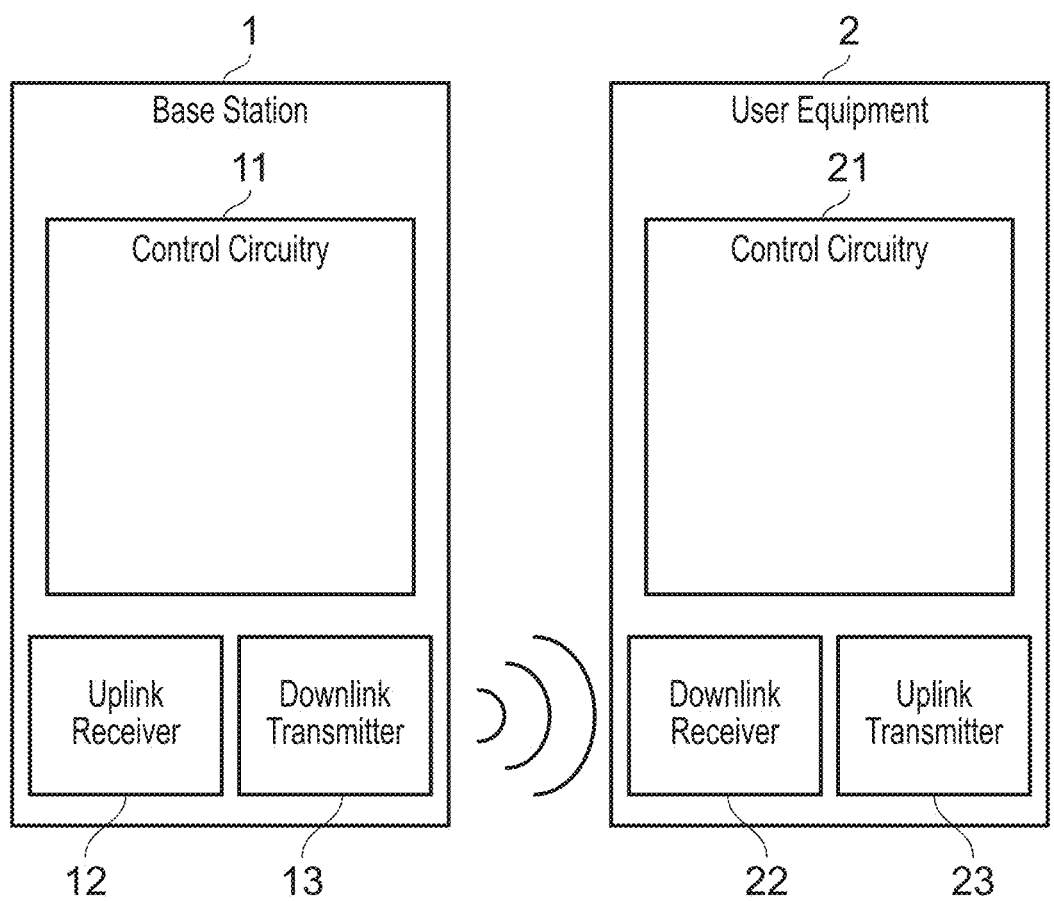
FIG. 2 schematically illustrates a base station and user equipment according to example embodiments.

FIG. 2 schematically illustrates a base station and user equipment according to example embodiments. The base station 1 and the user equipment 2 are configured to wirelessly communicate using component carriers. A given component carrier is initially designated as the primary component carrier, which is used for both uplink and downlink communication. The control circuitry 11 of the base station 1 controls the component carrier testing procedure described herein. The component carrier testing procedure is used to determine the quality of each tested component carrier. The uplink receiver 12 receives uplink traffic on the tested CC as sent by the uplink transmitter 23 of the user equipment 2. The control circuitry 11 of the base station 1 determines the quality of the CC. Once the quality of all CCs to be tested has been determined, the control circuitry 11 may designate a new primary CC. Downlink traffic is transmitted by the downlink transmitter 13 of the base station 1 and received by the downlink receiver 22 of the user equipment 2.

The control circuitry 21 of the user equipment 2 participates in the component carrier testing procedure. For each tested component carrier in turn, the control circuitry 21 controls the uplink transmitter 23 to transmit uplink traffic via that component carrier. This traffic is then received by the uplink receiver 12 of the base station 1, which performs the CC quality determination and determines if the designation of the primary CC should be changed. The control circuitry 21 of the user equipment 2 also responds to this determination made by the control circuitry 11 of the base station 1 by changing the primary CC if appropriate. It will be appreciate that the figure is merely schematic and only includes those components relevant to the present discussion of this example.

Figure 3A:
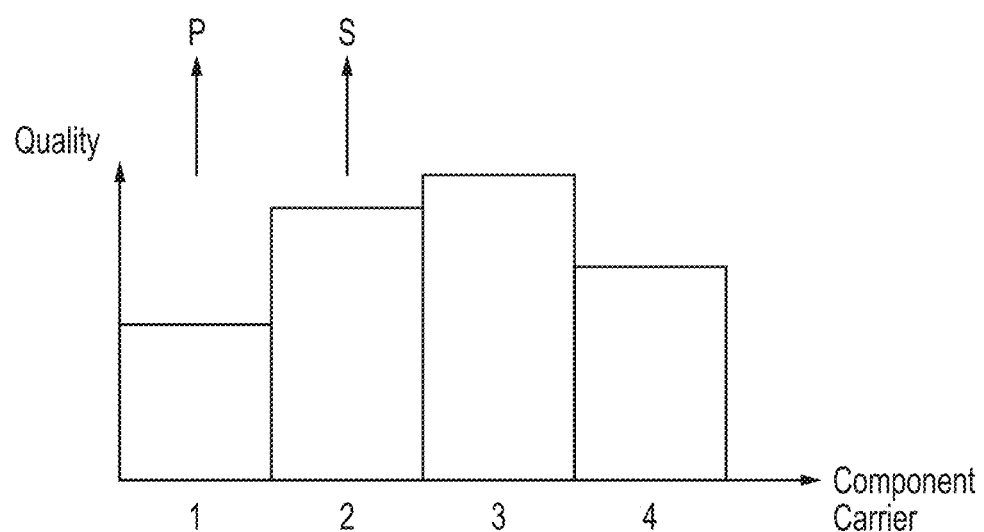
FIGS. 3A and 3B schematically illustrate the allocation and reallocation of primary and secondary component carriers based on a quality level and according to an example embodiment.
Figure 3B:
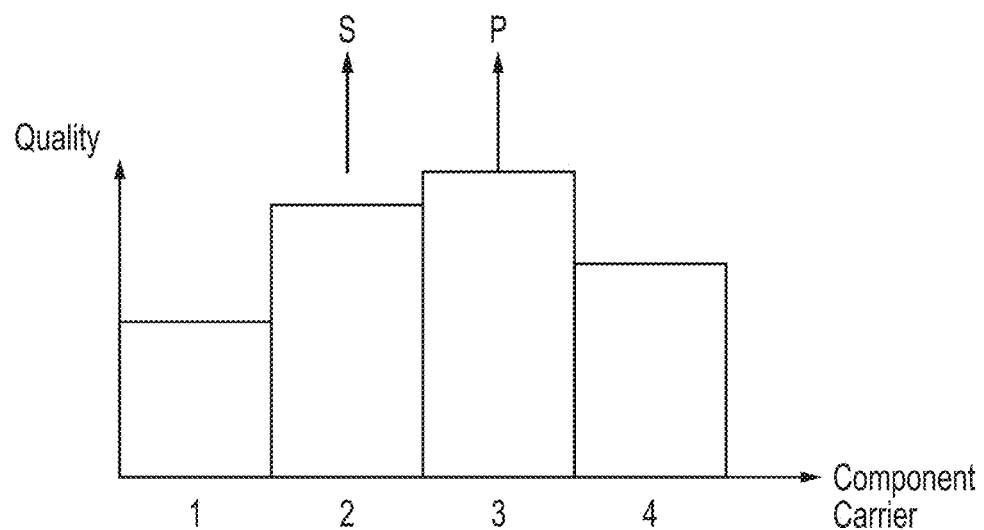

FIGS. 3A and 3B schematically illustrate the allocation and reallocation of primary and secondary component carriers based on measured quality levels and according to an example embodiment. FIGS. 3A and B show an example of the quality levels of four component carriers, the bars representing a measure of the quality of each CC labelled 1-4. This quality may for example be based on measured throughput. Initially, as shown in FIG. 3A the component carrier 1 is designated the primary CC, where this is the first CC used to acquire the initial downlink connection. The component carrier testing procedure described herein is used to determine the quality of the other CCs 2-4. The upward arrows indicate CCs with uplink capability, "P" representing the primary CC and "S" the secondary uplink CC.

From the determination in this illustrated example, CC 3 is determined to be that with the highest quality. Accordingly, as shown in FIG. 3B, CC 3 is designated as the primary CC (for both uplink and downlink communication). CC 2 is determined to have the second highest quality and it is accordingly designated as the secondary uplink CC.

Figure 4A:
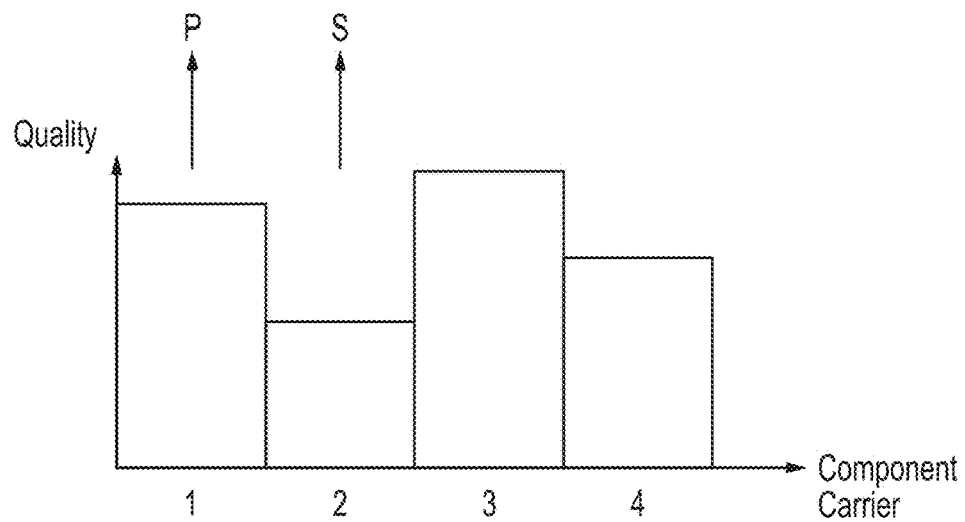
FIGS. 4A, 4B, 4C schematically illustrate the allocation and reallocation of primary and secondary component carriers based on a quality level and a hysteresis value according to an example embodiment.
Figure 4B:
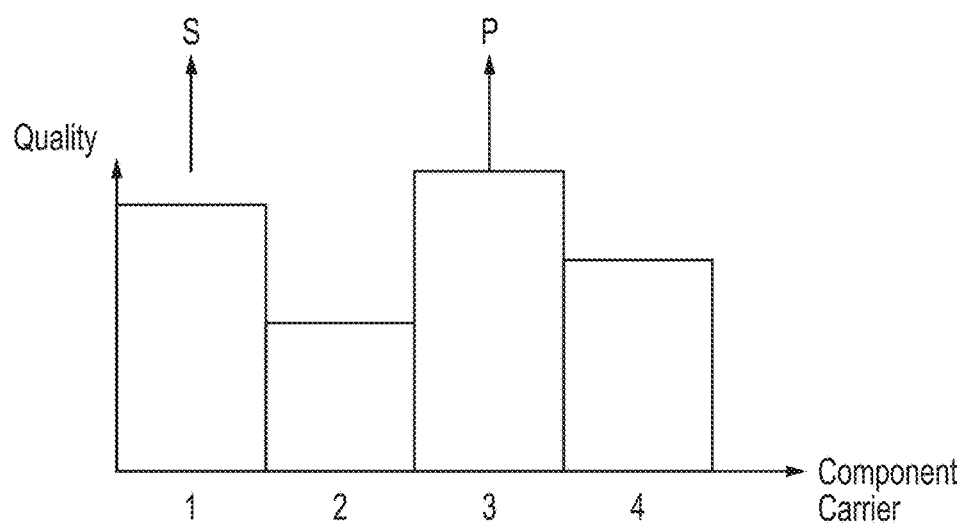
Figure 4C:
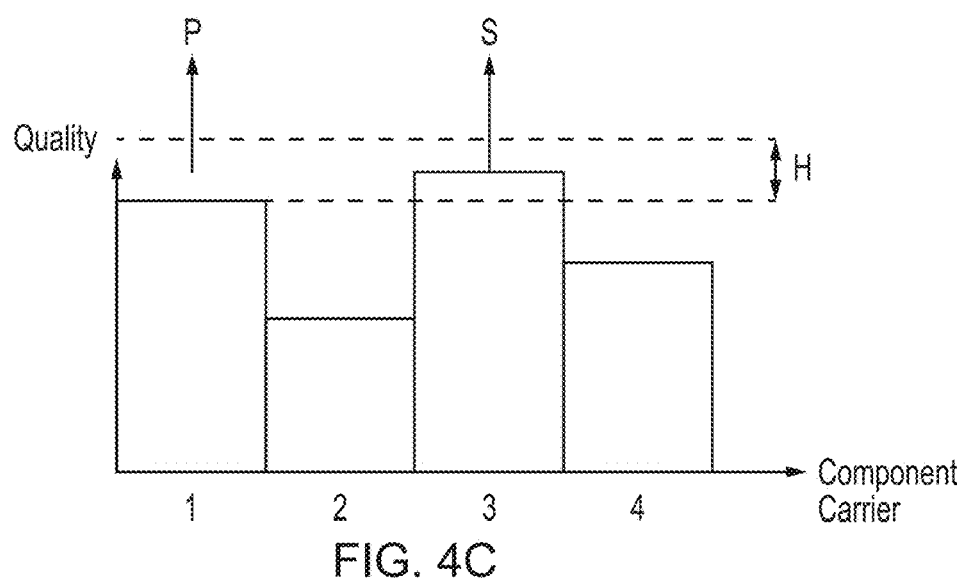

FIGS. 4A-C schematically illustrate the allocation and reallocation of primary and secondary component carriers based on a quality level and a hysteresis value according to an example embodiment. As in FIGS. 3A and B, FIGS. 4A-C indicate the measured quality of each of the component carriers 1-4. On initial setup, CC 1 is designated as the primary CC and CC 2 is designated as the secondary uplink CC. This is shown in FIG. 4A.

FIG. 4B shows the designation of the primary CC and secondary uplink CC in the case where no threshold value is imposed when re-designating the primary CC. CC 3 has the highest quality as measured by the component carrier testing procedure and so this is designated the primary CC. CC 2 has the next highest quality and so this is designated as the secondary uplink CC.

FIG. 4C illustrates the case where a hysteresis value H is included above the quality of the current component carrier (CC 1) when the threshold in calculated. That is, in order for the primary CC to be re-designated or switched, the candidate CC must have a quality measured to be equal to or greater than the quality of the current primary CC plus H. As can be seen from FIG. 4C, the CC with the highest quality (CC 3) does not exceed this threshold quality. Thus, the primary CC remains the same and the secondary uplink CC is switched to be CC 3. This technique is applied in recognition of the fact that switching the primary CC may be disruptive, at least temporarily, and depending on the system concerned, it may be that the cost of switching is considered to outweigh the benefits. However, changing the designation of a secondary uplink CC is typically less disruptive, and thus the opportunity may be taken to change the designation of a secondary uplink CC, when the primary CC designation could, but isn't, changed. This helps to support the quality of the connections provided, by making use of this identified high(er) quality CC for the secondary uplink CC.

Figure 5:
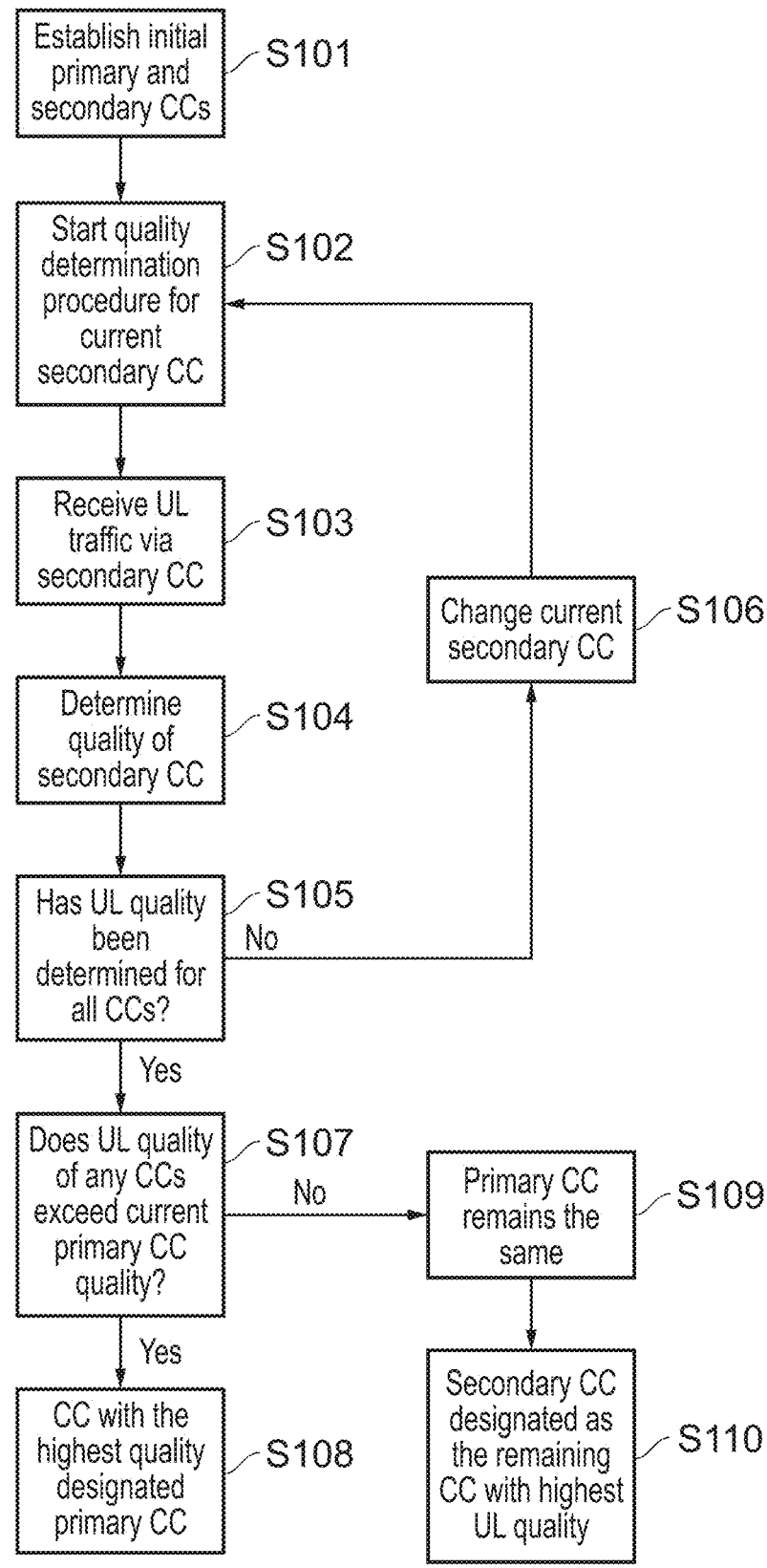
FIG. 5 is a flow diagram illustrating a sequence of steps in the method of example embodiments for reallocating primary component carriers based on uplink quality determination.

FIG. 5 is a flow diagram illustrating a sequence of steps in the method of example embodiments for reallocating primary component carriers based on uplink quality determination. At step S101 the initial primary and secondary CCs are established. As discussed above, the initial primary CC may be the CC used to acquire the initial downlink connection. Alternatively, the primary and secondary CCs may have been established previously as a result of the designation process having been undertaken. The quality determination procedure is controlled by a communication apparatus and is initialised at step S102. This procedure determines the quality of the current secondary uplink component carrier.

The communication apparatus receives uplink traffic via the current secondary uplink CC, at step S103 and uses this to determine the quality of that CC at step S104. If the quality of all of the available CCs has not yet been determined, the process proceeds from step S105 to step S106. The current CC is therefore switched so that the quality of another CC can be determined using the steps S102-S105.

Once the quality of all of the possible CCs has been determined, the process goes on to step S107. Here, a determination is made as to whether any of the CCs have a quality that exceeds that of the current primary CC. If this is the case, the CC with the highest quality is designated as the new primary CC at step S108. If none of the secondary CCs measured have a quality higher than that of the current primary CC, at step S109 the primary CC remains the same, and the secondary uplink CC is designated as the remaining CC with the highest quality.

Figure 6:
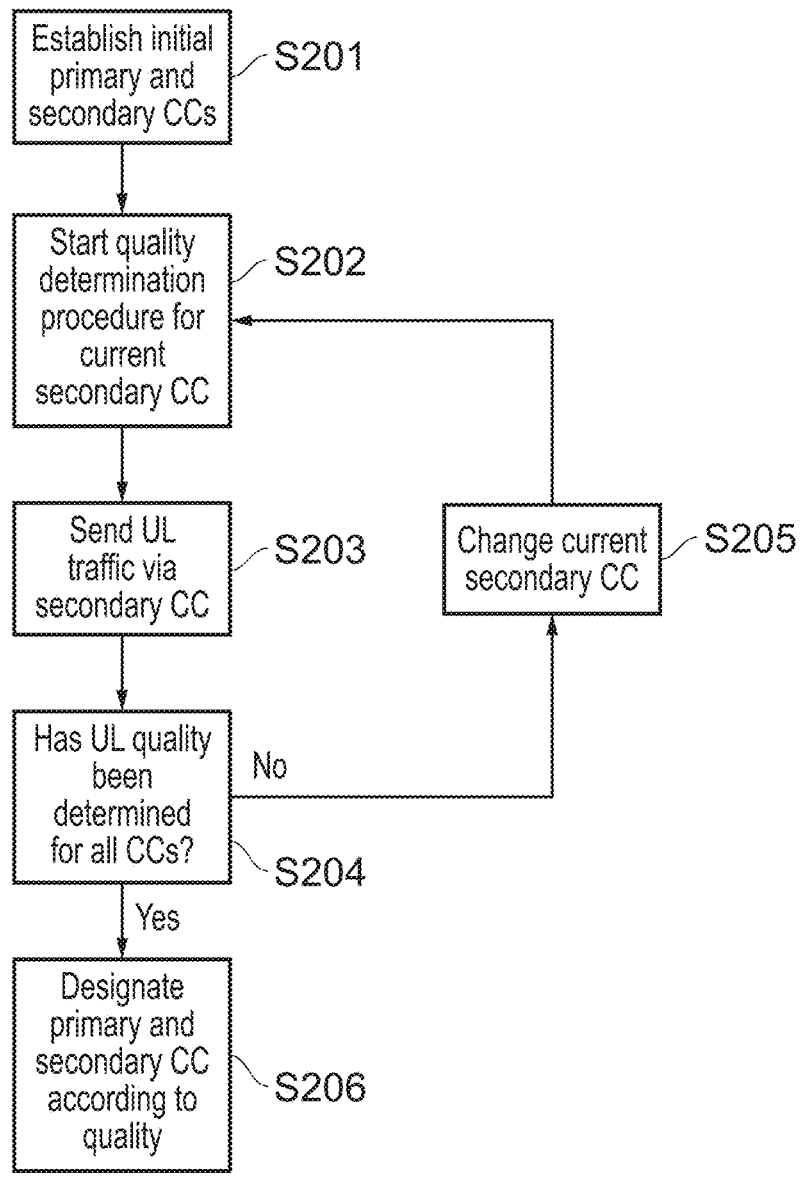
FIG. 6 is a flow diagram illustrating a sequence of steps in the method of example embodiments for a terminal apparatus reallocating primary component carriers.

FIG. 6 is a flow diagram illustrating a sequence of steps in the method of example embodiments for a terminal device reallocating primary component carriers. At step S201 the initial primary and secondary CCs are established. As above, these may be the default settings implemented at setup, or the result of a previous designation. At step S202 the quality determination procedure is started for the current secondary uplink CC. This includes, at step S203, sending uplink traffic via the current secondary uplink component carrier. At step S204 the terminal device then ascertains whether the quality of all of the CCs has been determined (although the determination itself may not have been made by the terminal device). If this is not the case, the current secondary uplink CC is changed, and the quality determination process of steps S202-S204 is repeated until all of the qualities have been established. Then, at step S206, the primary and secondary CCs are designated according to their quality. All following communications are therefore carried out according to these updated current primary and secondary CCs.

Figure 7:
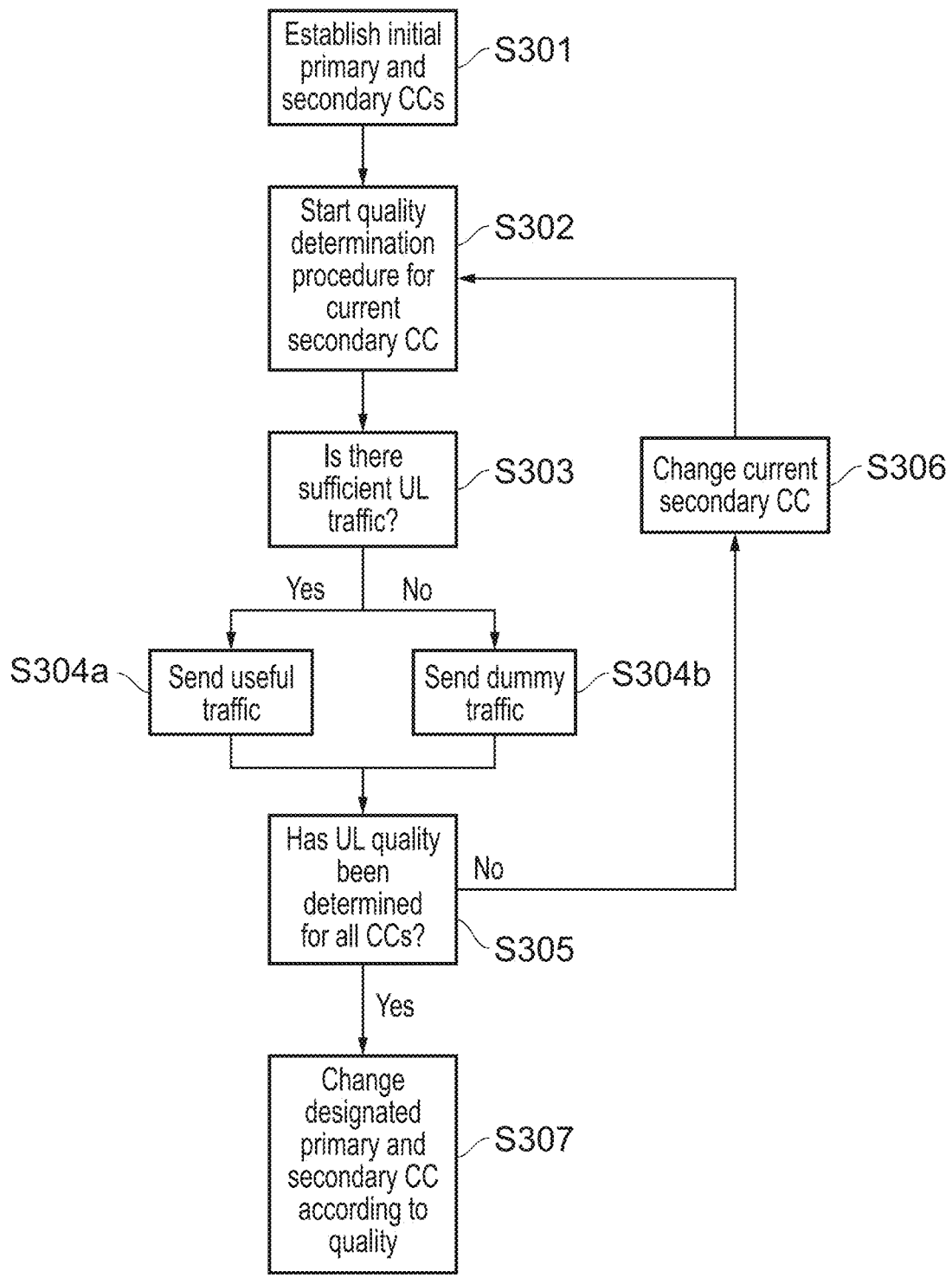
FIG. 7 is a flow diagram illustrating a sequence of steps in the method of example embodiments for sending dummy uplink traffic if necessary for reallocating primary component carriers.

FIG. 7 is a flow diagram illustrating a sequence of steps in the method of example embodiments for sending dummy uplink traffic if necessary for the process of assessing the uplink quality of potential primary component carriers. At step S301 the initial primary and secondary uplink CCs are established. The quality determination procedure as described previously is started at step S302 for the current secondary uplink component carrier. At step S303 a determination is made as to whether there is currently sufficient uplink traffic being sent to support the testing procedure. If there is, this "useful" traffic is simply sent at step S304a, but if not then the terminal sends dummy traffic via the current secondary uplink CC at step S304b. This dummy traffic is simply uplink traffic that has no useful purpose and is recognised as such by the receiving communication apparatus. For example such transmitted dummy data packets may be generated by padding (adding additional) data to the original limited UL data. It is thus essential that the eNodeB maintains limited data assignment to the UE at all times, and when the test procedure starts the onus is on the terminal to pad the data with dummy information. At step S305 it is established if the quality of all CCs has been determined. If not, then the current secondary CC is changed at step S306 and the quality determination process of steps S302-S305 is repeated. Once the quality of all CCs has been determined, a primary CC is designated, based on the quality determinations, at step S307.

Figure 8:
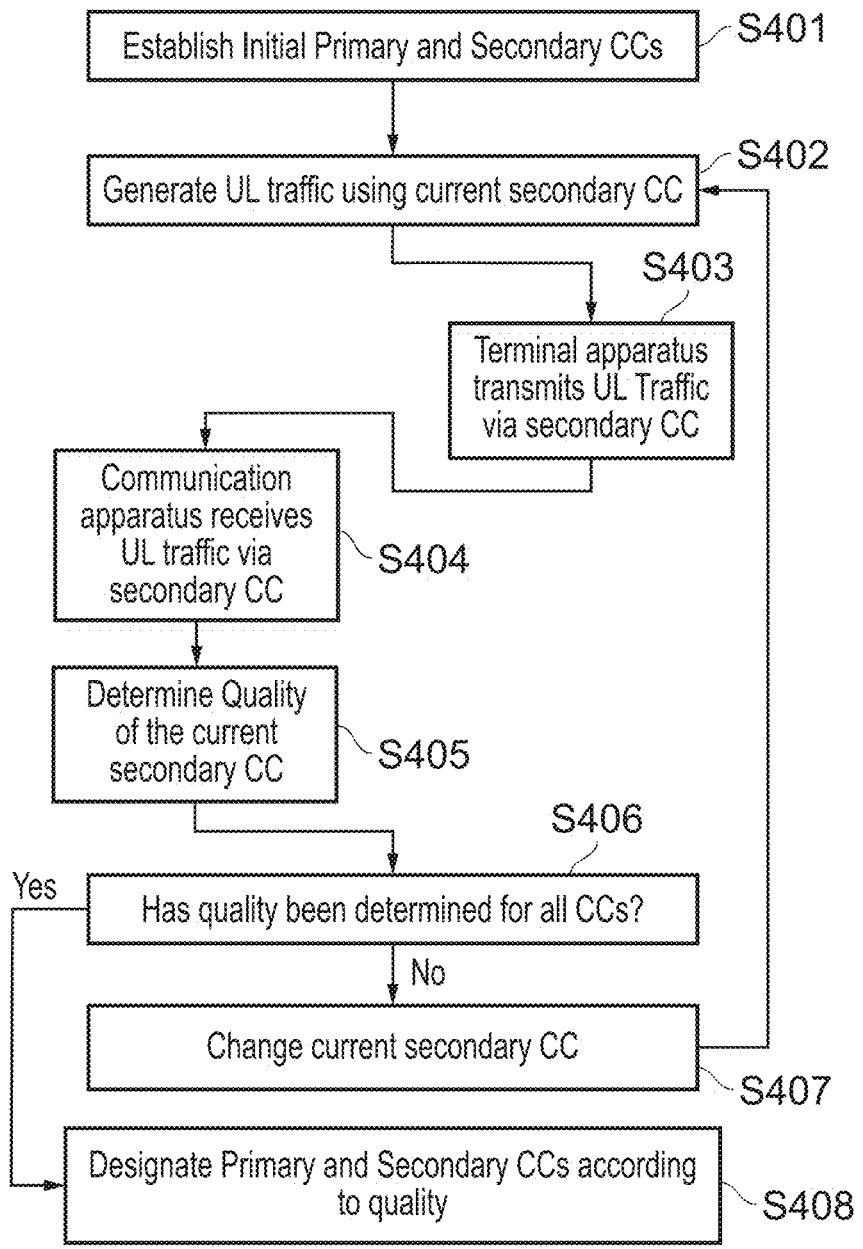
FIG. 8 is a flow diagram illustrating a sequence of steps in the method of example embodiments for a system to reallocate primary component carriers on the basis of a quality determination.

FIG. 8 is a flow diagram illustrating a sequence of steps in the method of example embodiments for a system to reallocate primary component carriers on the basis of a quality determination. At step S401 the initial primary and secondary CCs are established. As with the previous examples, this may be at initial setup or a previous designation procedure. All elements of the system recognise the same primary and secondary uplink CCs at any given point in the illustrated procedure. That is, if the primary or secondary CC changes for one element of the system, the other elements also recognise that change. At step S402 an uplink connection is established using a current secondary uplink CC to send uplink traffic. Uplink traffic is sent (at step S4043) from a transmitter of a terminal apparatus and received at step S404 by a communication apparatus. This received traffic is used to determine the quality of the secondary uplink CC used to send the traffic at step S405. If, at step S406, not all of the CCs have had a determination made as to their quality, then at step S407 the current secondary uplink CC is changed and the quality determination process is repeated from steps S402-S406. Once the quality of all of the CCs has been determined, primary and secondary uplink CCs can be designated based on the quality of those CCs at step S408.

Figure 9:
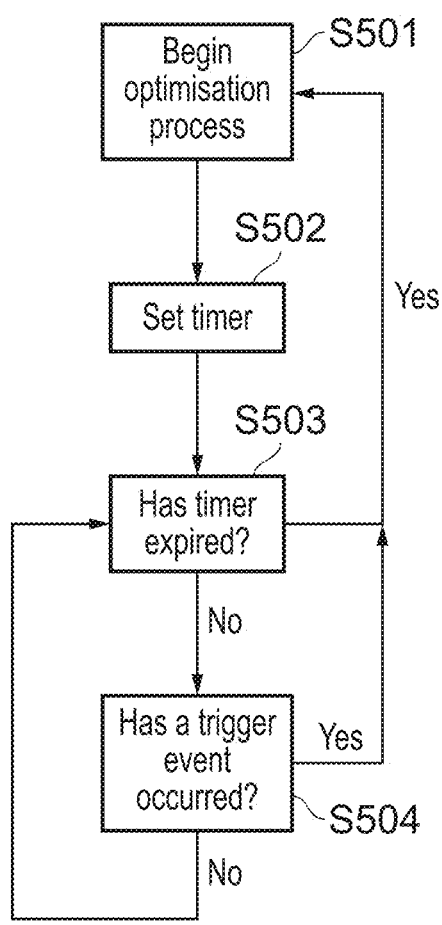
FIG. 9 is a flow diagram illustrating a sequence of steps in the method of example embodiments for an optimisation process according to a predetermined time period.

FIG. 9 is a flow diagram illustrating a sequence of steps in the method of example embodiments for an optimisation process which is repeated according to a predetermined time period. If an optimisation process such as the ones described above is required to be repeated with a given periodicity, it may be initially carried out at step S501 and then a timer is set at step S502. This is run until the timer expires at step S503 when the optimisation process is repeated at step S501. If the timer has not expired, but a trigger event occurs, the optimisation process may also be repeated. This trigger event could be an error occurring within the wider system, or the quality of the primary CC dropping below a predetermined level for example.

Figure 10:
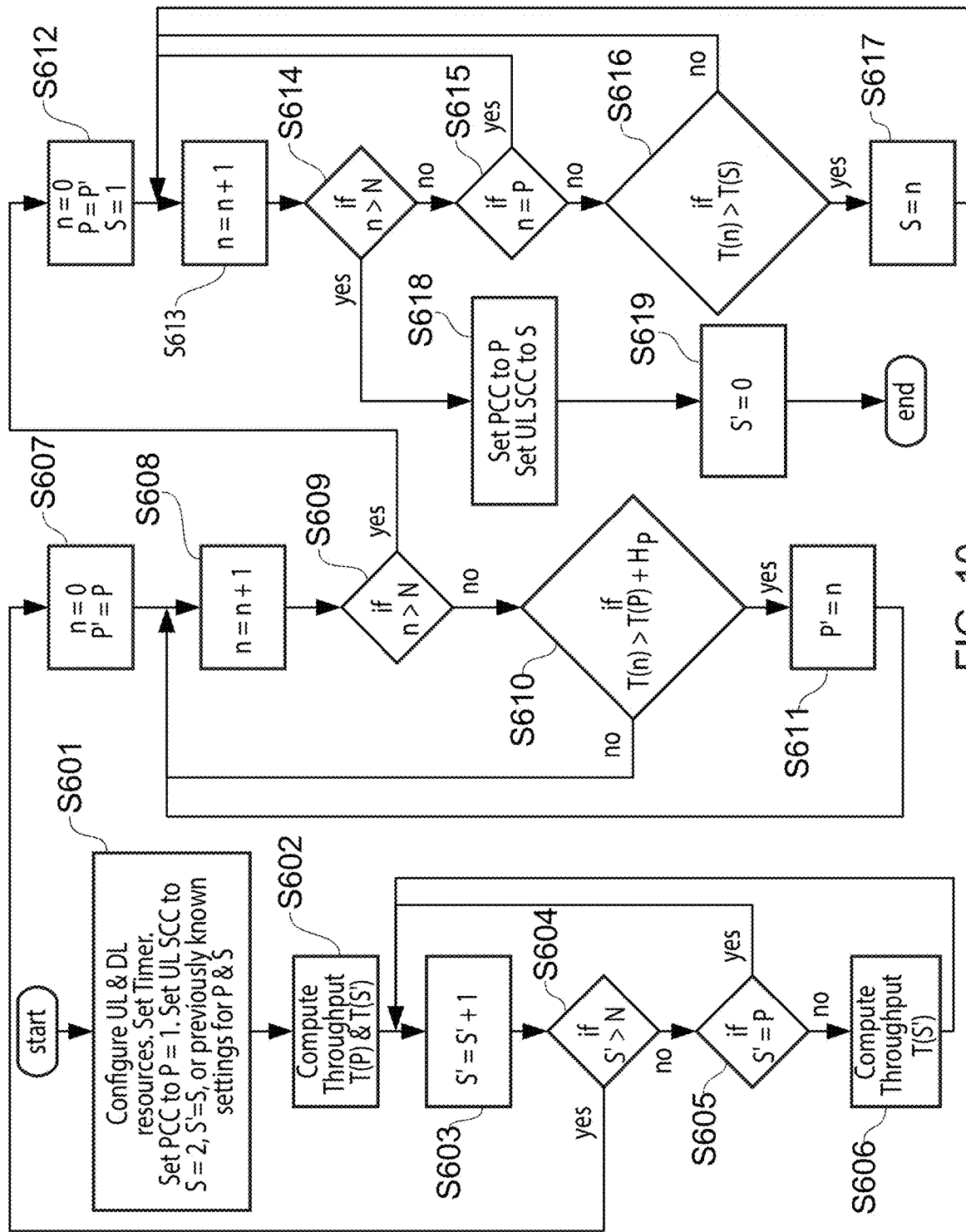
FIG. 10 is a flow diagram illustrating a sequence of steps in the method of example embodiments for primary component carrier reallocation.

FIG. 10 is a flow diagram illustrating a sequence of steps in the method of example embodiments for primary component carrier reallocation. At step S601, the optimisation process begins. The initial uplink and downlink connections are established and a timer is (re)set. A component carrier 1 is set to be the primary CC, i.e. P=1. Similarly the component carrier 2 is set as the secondary uplink CC, i.e. S=2, and initially the parameter S' (the currently tested CC) is set as S'=S. Otherwise, an initial configuration of the designations may be taken as the starting parameters for the process, i.e. a PCC and SCC may be been previously designated and the process may be viewed as an optimisation step to review those designations and to determine if any changes of designation are desirable.

The throughput T(P) of the current primary CC and the throughput T(S') of the secondary CC are calculated at step S602. S' is then incremented at step S603. If S' then exceeds the number of CCs to be tested in the system, N, at step S604, then all CCs required to be tested have had their throughput measured. If this is not the case, then at step S605 a determination is made to see if the currently tested CC is the primary CC (i.e. S'=P). If so, then S' is incremented and the process returns to step S603. Otherwise, at step S606 the throughput T(S') of S' is determined. The process then goes back to step S603 and S' is incremented again, Once all of the CCs to be tested (all of the valid values of S') have had their throughput computed, the process moves from step S604 to step S607. Here, a new parameter n is introduced and set to 0. n is used in the following to indicate a current CC of interest. A algorithmic parameter P' is also set to the current value of P. At step S608 n is incremented and then at step S609 a determination is made as to whether all CCs have been examined, i.e. if n>N. If not, then at step S610 a determination is made as to whether the throughput calculated for the CC corresponding to the current value of n exceeds the throughput of the current primary CC plus a hysteresis value $H_P$. If this is the case then the value of P' is changed to the value of the currently examined CC, n in step S611. In other words the designation of the primary CC is changed to be the currently examined CC. Then the process returns to step S608 and n is incremented so that the next CC can be examined.

Once all values of n, i.e. up to and including N, have been examined (as is determined at step S609), the process moves to step S612 in order for a selection of the most appropriate secondary UL CC to begin. At step S612 the value of n is reset to zero, P is set to the value of P' and the value of S is set to 1. At step S613 n is then incremented. If at setup S614 n is not greater than N, i.e. not all CCs have been examined, then the process moves to step S615. Here if n=P the process returns to step S613 as the primary CC cannot be the same as the secondary CC. Otherwise, a determination is made at step 616 as to whether the quality (here, the throughput) of the currently examined CC, T(n), is greater than that of the current secondary CC. If it is not then the process returns to step S613 and n is incremented. Otherwise at step S617 S is set equal to the current value of n. Thus the currently considered secondary CC candidate is set to be the designated secondary CC if its quality is higher. The flow then returns and n is incremented at step S613.

Once (at step S614) n>N then all of the CCs have been examined as candidates to be designated as the secondary CC. The process then moves to step S618 where the CC enumerated P is designated as the primary CC and the CC enumerated S is designated as the UL SCC. Thereafter S' is reset to zero at step S619. The process is then at an end.

The present techniques provides a method and apparatus allowing for improved UL CC assignment, by selecting the best set of UL CCs that increases throughput for example. It should be clear other metrics may also be used instead. The method can be used to generate UL traffic during this measurement process from the host UE (when limited user traffic is present) and adaptively switch between UL CCs using rrcConnectionReconfiguration messages for example. In addition the PCC reselection may be carried out using the handover procedure. Since the handover procedure may be costly in terms of data throughput, it is possible to introduce a hysteresis to penalise repeated PCC reselections. The CC selection may be invoked once during setup, or periodically using predetermined timers to select the periodicity and the duration of the optimisation process.

In brief overall summary a communication apparatus, terminal apparatus, system and method are provided for performing wireless communication. The communication apparatus supports a plurality of component carriers, wherein one of the plurality of component carriers is designated as a current primary component and at least one of the plurality of component carriers is designated as a current secondary component carrier providing at least downlink communication. The communication apparatus comprises control circuitry for controlling a component carrier testing procedure for one or more component carriers. The testing procedure comprises, for each component carrier: establishing an uplink connection from the terminal apparatus to the communication apparatus using the component carrier; and determining a quality of the uplink connection for the component carrier. The control circuitry is responsive to completion of the testing procedure to designate an updated primary component carrier on the basis of the qualities of the uplink connections determined for the component carriers.

Various example configurations are set out in the following numbered clauses:

Clause 1. A communication apparatus for performing wireless communication with a terminal apparatus,
  wherein the communication apparatus supports a plurality of component carriers, wherein one of the plurality of component carriers is designated as a current primary component carrier providing uplink and downlink communication and at least one of the plurality of component carriers is designated as a current secondary component carrier providing at least downlink communication,
  the communication apparatus comprising control circuitry for controlling a component carrier testing procedure for one or more component carriers, the component carrier testing procedure comprising, for each component carrier:
    establishing an uplink connection from the terminal apparatus to the communication apparatus using the component carrier; and
    determining a quality of the uplink connection for the component carrier,
  and the control circuitry is responsive to completion of the component carrier testing procedure to designate an updated primary component carrier on the basis of the qualities of the uplink connections determined for the component carriers.

Clause 2. The communication apparatus according to Clause 1, wherein the updated primary component carrier is designated based on a parameter representing the quality of the uplink connection for the component carrier exceeding a predetermined value.

Clause 3. The communication apparatus according to Clause 2, wherein the parameter representing the quality of the uplink connection for the component carrier is a measure of uplink throughput.

Clause 4. The communication apparatus according to Clause 2, wherein the parameter representing the quality of the uplink connection for the component carrier is a measure of signal strength.

Clause 5. The communication apparatus according to Clause 2, wherein the predetermined value is a parameter representing the uplink quality of the current primary component carrier plus an additional threshold value.

Clause 6. A terminal apparatus for performing wireless communication with a communication apparatus,
- wherein the terminal apparatus supports a plurality of component carriers, wherein one of the plurality of component carriers is designated as a current primary component carrier providing uplink and downlink communication and at least one of the plurality of component carriers is designated as a current secondary component carrier providing at least downlink communication,
- the terminal apparatus comprising control circuitry for participating in a component carrier testing procedure for one or more component carriers, the component carrier testing procedure comprising, for each component carrier:
  - establishing an uplink connection from the terminal apparatus to the communication apparatus using the component carrier; and
  - sending uplink traffic via the uplink connection,
- and the control circuitry is responsive to a determination made by the communication apparatus to designate an updated primary component carrier.

Clause 7. The terminal apparatus according to Clause 6, wherein the terminal apparatus is configured to generate dummy uplink traffic for the component carrier testing procedure when insufficient uplink traffic for the component carrier testing procedure would otherwise be generated for communication purposes.

Clause 8. The apparatus according to any preceding Clause, wherein the component carrier testing procedure and designation of the updated primary component carrier is repeated periodically.

Clause 9. The apparatus according to Clause 8, wherein the component carrier testing procedure and designation of the updated primary component carrier is repeated with fixed, predetermined periodicity.

Clause 10. The apparatus according to Clause 8, wherein the component carrier testing procedure and designation of the updated primary component carrier is repeated with a selectable periodicity.

Clause 11. The apparatus according to any preceding Clause, wherein the component carrier testing procedure and designation of the updated primary component carrier is carried out upon setup of a wireless communication link between the communication apparatus and the terminal apparatus.

Clause 12. The apparatus according to any preceding Clause, wherein the primary component carrier is the component carrier which is used to establish an initial downlink connection.

Clause 13. The apparatus according to any preceding Clause, wherein a duration of the testing procedure is selectable.

Clause 14. The apparatus according to any preceding Clause, wherein at least one secondary component carrier also provides uplink communication.

Clause 15. The apparatus according to any preceding Clause, wherein in the component carrier testing procedure the component carrier is designated as a secondary uplink component carrier in order to carry out the component carrier testing procedure.

Clause 16. The apparatus according to any preceding Clause, wherein an updated secondary uplink component carrier is also designated on the basis of the qualities of the uplink connections determined for the component carriers.

Clause 17. A communication system comprising a communication apparatus and a terminal apparatus,
- wherein the communication apparatus and the terminal apparatus support a plurality of component carriers, wherein one of the plurality of component carriers is designated as a current primary component carrier providing uplink and downlink communication and at least one of the plurality of component carriers is designated as a current secondary component carrier providing at least downlink communication,
- the communication apparatus comprising control circuitry for controlling a component carrier testing procedure for one or more component carriers the component carrier testing procedure comprising, for each component carrier:
  - establishing an uplink connection from the terminal apparatus to the communication apparatus using the component carrier; and
  - determining a quality of the uplink connection for the component carrier, and
- the terminal apparatus comprising control circuitry for participating in the component carrier testing procedure for one or more component carriers comprising, for each component carrier:
  - establishing the uplink connection with the communication apparatus using the component carrier; and
  - sending uplink traffic via the uplink connection,
- wherein the control circuitry of the communication apparatus is responsive to completion of the component carrier testing procedure to designate an updated primary component carrier on the basis of the qualities of the uplink connections determined for the component carriers.

Clause 18. The communication system according to Clause 17, wherein the terminal is attached to a vehicle arranged to move relative to the communication apparatus.

Clause 19. The communication system according to Clause 18, wherein the vehicle is an aeroplane.

Clause 20. A communication method for use in a communication apparatus for performing wireless communication with a terminal apparatus,
- wherein the communication apparatus supports a plurality of component carriers, wherein one of the plurality of component carriers is designated as a current primary component carrier providing uplink and downlink communication and at least one of the plurality of component carriers is designated as a secondary uplink component carrier providing at least downlink communication,
- the method comprising:
  - controlling a component carrier testing procedure for one or more component carriers, the component carrier testing procedure comprising, for each component carrier:

establishing an uplink connection from the terminal apparatus to the communication apparatus using the component carrier; and determining a quality of the uplink connection for the component carrier, and in response to completion of the component carrier testing procedure, designating an updated primary component carrier on the basis of the qualities of the uplink connections determined for the component carriers.

Clause 21. A communication method for use in a terminal apparatus for performing wireless communication with a communication apparatus, wherein the terminal apparatus supports a plurality of component carriers, wherein one of the plurality of component carriers is designated as a current primary component carrier providing uplink and downlink communication and at least one of the plurality of component carriers is designated as a current secondary component carrier providing at least downlink communication, the method comprising:

participating in a component carrier testing procedure for one or more component carriers, the component carrier testing procedure comprising, for each component carrier:

establishing an uplink connection from the terminal apparatus to the communication apparatus using the component carrier; and sending uplink traffic via the uplink connection, and designating an updated primary component carrier in response to a determination made by the communication apparatus.

Clause 22. A communication method for performing wireless communication for use in system comprising a communication apparatus and a terminal apparatus, wherein a plurality of component carriers are supported, wherein one of the plurality of component carriers is designated as a current primary component carrier providing uplink and downlink communication and at least one of the plurality of component carriers is designated as a current secondary component carrier providing at least downlink communication, the method comprising:

controlling a component carrier testing procedure for one or more component carriers, the component carrier testing procedure comprising, for each component carrier:

establishing an uplink connection from the terminal apparatus to the communication apparatus using the component carrier;

transmitting uplink traffic via the uplink connection;

and determining a quality of the uplink connection for the component carrier, and designating an updated primary component carrier in response to completion of the component carrier testing procedure on the basis of the qualities of the uplink connections determined for the component carriers.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A communication apparatus for performing wireless communication with a terminal apparatus, wherein the communication apparatus supports a plurality of component carriers, wherein one of the plurality of component carriers is designated as a current primary component carrier providing uplink and downlink communication and at least one of the plurality of component carriers is designated as a current secondary component carrier providing at least downlink communication, the communication apparatus comprising control circuitry for controlling a component carrier testing procedure for one or more component carriers, the component carrier testing procedure comprising operations including:

(i) establishing an uplink connection from the terminal apparatus to the communication apparatus using the current secondary component carrier;

(ii) receiving uplink traffic via the current secondary component carrier;

(iii) determining a quality of the uplink connection for the current secondary component carrier based on the uplink traffic received via the current secondary component carrier;

(iv) designating, as the current secondary component carrier, a component carrier, of the one or more component carriers, for which the component carrier testing procedure has not yet been performed; and (v) repeating operations (i) to (iv) until the component carrier testing procedure has been performed for of each of the one or more component carriers as the current secondary component carrier, wherein the control circuitry is responsive to completion of the component carrier testing procedure to designate an updated primary component carrier on the basis of the qualities of the uplink connections determined for the component carriers as the current secondary component carrier during the component carrier testing procedure.

2. The communication apparatus according to claim 1, wherein the updated primary component carrier is designated based on a parameter representing the quality of the uplink connection for the component carrier exceeding a predetermined value.

3. The communication apparatus according to claim 2, wherein the parameter representing the quality of the uplink connection for the component carrier is a measure of uplink throughput.

4. The communication apparatus according to claim 2, wherein the parameter representing the quality of the uplink connection for the component carrier is a measure of signal strength.

5. The communication apparatus according to claim 2, wherein the predetermined value is a parameter representing the uplink quality of the current primary component carrier plus an additional threshold value.

6. A terminal apparatus for performing wireless communication with a communication apparatus,
wherein the terminal apparatus supports a plurality of component carriers, wherein one of the plurality of component carriers is designated as a current primary component carrier providing uplink and downlink communication and at least one of the plurality of component carriers is designated as a current secondary component carrier providing at least downlink communication,
the terminal apparatus comprising control circuitry for participating in a component carrier testing procedure for one or more component carriers, the component carrier testing procedure comprising operations including:
(a) establishing an uplink connection from the terminal apparatus to the communication apparatus using the current secondary component carrier;
(b) sending uplink traffic via the uplink connection established using the current secondary component carrier, for use by the communication apparatus in determining a quality of the uplink connection for the current secondary component carrier;
(c) changing the current secondary component carrier to a component carrier, of the one or more component carriers, for which the component carrier testing procedure has not yet been performed; and
(d) repeating operations (a) to (c) until the component carrier testing procedure has been performed for of each of the one or more component carriers as the current secondary component carrier,
wherein the control circuitry is responsive to a determination made by the communication apparatus to designate an updated primary component carrier.

7. The terminal apparatus according to claim 6, wherein the terminal apparatus is configured to generate dummy uplink traffic for the component carrier testing procedure when insufficient uplink traffic for the component carrier testing procedure would otherwise be generated for communication purposes.

8. The communication apparatus according to claim 1, wherein the component carrier testing procedure and designation of the updated primary component carrier is repeated periodically.

9. The communication apparatus according to claim 8, wherein the component carrier testing procedure and designation of the updated primary component carrier is one of:
repeated with fixed, predetermined periodicity; and
repeated with a selectable periodicity.

10. The communication apparatus according to claim 1, wherein the component carrier testing procedure and designation of the updated primary component carrier is carried out upon setup of a wireless communication link between the communication apparatus and the terminal apparatus.

11. The communication apparatus according to claim 1, wherein the primary component carrier is the component carrier which is used to establish an initial downlink connection.

12. The communication apparatus according to claim 1, wherein at least one secondary component carrier also provides uplink communication.

13. The communication apparatus according to claim 1, wherein an updated secondary component carrier is also designated on the basis of the qualities of the uplink connections determined for the component carriers.

14. A communication system comprising a communication apparatus and a terminal apparatus,
wherein the communication apparatus and the terminal apparatus support a plurality of component carriers, wherein one of the plurality of component carriers is designated as a current primary component carrier providing uplink and downlink communication and at least one of the plurality of component carriers is designated as a current secondary component carrier providing at least downlink communication,
the communication apparatus comprising control circuitry for controlling a component carrier testing procedure for one or more component carriers the component carrier testing procedure comprising operations including:
(i) establishing an uplink connection from the terminal apparatus to the communication apparatus using the current secondary component carrier;
(ii) receiving uplink traffic via the current secondary component carrier;
(iii) determining a quality of the uplink connection for the current secondary component carrier based on the uplink traffic received via the current secondary component carrier;
(iv) designating, as the current secondary component carrier, a component carrier for which the component carrier testing procedure has not yet been performed; and
(v) repeating operations (i) to (iv) until the component carrier testing procedure has been performed for of each of the one or more component carriers as the current secondary component carrier, and
the terminal apparatus comprising control circuitry for participating in the component carrier testing procedure for one or more component carriers comprising operations including:
(a) establishing an uplink connection from the terminal apparatus to the communication apparatus using the current secondary component carrier;
(b) sending uplink traffic via the uplink connection established using the current secondary component carrier, for use by the communication apparatus in determining a quality of the uplink connection for the current secondary component carrier; and
(c) changing the current secondary component carrier to a component carrier, of the one or more component carriers, for which the component carrier testing procedure has not yet been performed; and
(d) repeating operations (a) to (c) until the component carrier testing procedure has been performed for of each of the one or more component carriers as the current secondary component carrier,
wherein the control circuitry of the communication apparatus is responsive to completion of the component carrier testing procedure to designate an updated primary component carrier on the basis of the qualities of the uplink connections determined for the component carriers.

15. The communication system according to claim 14, wherein the terminal is attached to a vehicle arranged to move relative to the communication apparatus.

16. The communication system according to claim 15, wherein the vehicle is an aeroplane.

17. A communication method for use in a communication apparatus for performing wireless communication with a terminal apparatus, wherein the communication apparatus supports a plurality of component carriers, wherein one of the plurality of component carriers is designated as a current primary component carrier providing uplink and downlink communication and at least one of the plurality of component carriers is designated as a current secondary component carrier providing at least downlink communication, the method comprising:
controlling a component carrier testing procedure for one or more component carriers, the component carrier testing procedure comprising operations including:
(i) establishing an uplink connection from the terminal apparatus to the communication apparatus using the current secondary component carrier;
(ii) receiving uplink traffic via the current secondary component carrier:
(iii) determining a quality of the uplink connection for the current secondary component carrier based on the uplink traffic received via the current secondary component carrier;
(iv) designating, as the current secondary component carrier, a component carrier, of the one or more component carriers, for which the component carrier testing procedure has not yet been performed; and
(v) repeating operations (i) to (iv) until the component carrier testing procedure has been performed for of each of the one or more component carriers as the current secondary component carrier; and
in response to completion of the component carrier testing procedure, designating an updated primary component carrier on the basis of the qualities of the uplink connections determined for the component carriers.

18. A communication method for use in a terminal apparatus for performing wireless communication with a communication apparatus, wherein the terminal apparatus supports a plurality of component carriers, wherein one of the plurality of component carriers is designated as a current primary component carrier providing uplink and downlink communication and at least one of the plurality of component carriers is designated as a current secondary component carrier providing at least downlink communication, the method comprising:
participating in a component carrier testing procedure for one or more component carriers, the component carrier testing procedure comprising operations including:
(a) establishing an uplink connection from the terminal apparatus to the communication apparatus using the current secondary component carrier;
(b) sending uplink traffic via the uplink connection established using the current secondary component carrier, for use by the communication apparatus in determining a quality of the uplink connection for the current secondary component carrier; and
(c) changing the current secondary component carrier to a component carrier, of the one or more component carriers, for which the component carrier testing procedure has not yet been performed; and
(d) repeating operations (a) to (c) until the component carrier testing procedure has been performed for of each of the one or more component carriers as the current secondary component carrier; and
designating an updated primary component carrier in response to a determination made by the communication apparatus.

19. A communication method for performing wireless communication for use in a system comprising a communication apparatus and a terminal apparatus, wherein a plurality of component carriers are supported, wherein one of the plurality of component carriers is designated as a current primary component carrier providing uplink and downlink communication and at least one of the plurality of component carriers is designated as a current secondary component carrier providing at least downlink communication, the method comprising:
controlling a component carrier testing procedure for one or more component carriers, the component carrier testing procedure comprising operations including:
(i) establishing an uplink connection from the terminal apparatus to the communication apparatus using the current secondary component carrier;
(ii) receiving uplink traffic via the current secondary component carrier;
(iii) determining a quality of the uplink connection for the current secondary component carrier based on the uplink traffic received via the current secondary component carrier;
(iv) designating, as the current secondary component carrier, a component carrier, of the one or more component carriers, for which the component carrier testing procedure has not yet been performed; and
(v) repeating operations (i) to (iv) until the component carrier testing procedure has been performed for of each of the one or more component carriers as the current secondary component carrier; and
and determining a quality of the uplink connection for the component and designating an updated primary component carrier in response to completion of the component carrier testing procedure on the basis of the qualities of the uplink connections determined for the component carriers.

* * * * *

UNITED STATES PATENT AND TRADEMARK OFFICE
CERTIFICATE OF CORRECTION

| | |
|---|---|
| PATENT NO. | : 11,582,670 B2 |
| APPLICATION NO. | : 16/836638 |
| DATED | : February 14, 2023 |
| INVENTOR(S) | : Venkateswarlu Katepalli et al. |

It is certified that error appears in the above-identified patent and that said Letters Patent is hereby corrected as shown below:

In the Claims

In Claim 19, at Column 22, Line 52 at the beginning of the line, delete "and determining a quality of the uplink connection for the component and"

Signed and Sealed this
Eleventh Day of April, 2023

Katherine Kelly Vidal
*Director of the United States Patent and Trademark Office*